(12) United States Patent
Jahn et al.

(10) Patent No.: US 6,738,040 B2
(45) Date of Patent: May 18, 2004

(54) DIFFERENT DISPLAY TYPES IN A SYSTEM-CONTROLLED, CONTEXT-DEPENDENT INFORMATION DISPLAY

(75) Inventors: Dirk Jahn, Aachen (DE); Bruno Kiesel, Erlangen (DE); Wolfgang Wohlgemuth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 133 days.

(21) Appl. No.: 09/934,702

(22) Filed: Aug. 22, 2001

(65) Prior Publication Data

US 2002/0089544 A1 Jul. 11, 2002

(30) Foreign Application Priority Data

Aug. 22, 2000 (DE) .......................................... 100 41 103
Apr. 2, 2001 (DE) .......................................... 101 16 331

(51) Int. Cl.[7] ................................................. G09G 5/00
(52) U.S. Cl. ....................................... 345/156; 345/1.1
(58) Field of Search .......................... 345/156, 1.1–1.3, 345/2.1–2.3, 4–8, 629–637

(56) References Cited

U.S. PATENT DOCUMENTS

| | | | | |
|---|---|---|---|---|
| 5,285,792 A | * | 2/1994 | Sjoquist et al. ............. | 600/510 |
| 5,781,913 A | * | 7/1998 | Felsenstein et al. ......... | 345/169 |
| 6,346,929 B1 | * | 2/2002 | Fukushima et al. ............ | 345/8 |
| 6,356,437 B1 | * | 3/2002 | Mitchell et al. ............ | 361/683 |
| 6,466,232 B1 | * | 10/2002 | Newell et al. .............. | 345/700 |

OTHER PUBLICATIONS

Rekimoto et al., "The World Through the Computer: Computer Augmented Interaction with Real World Environment", ACM, Nov. 1995.*

Siewiorek D. et al., "Adtranz : a mobile computing system for maintenance and collaboration", IEEE, Wearable Computers, 1998, Second International Symposium, Oct. 1998.*

\* cited by examiner

*Primary Examiner*—Alexander Eisen
(74) *Attorney, Agent, or Firm*—Baker Botts L.L.P.

(57) ABSTRACT

The invention relates to a system and a method for combined use of different types of display with system-controlled, context-dependent information display, having a mobile data processing apparatus and having a plurality of interaction devices which are operated in parallel by the mobile data processing apparatus for display and/or input, and having a higher-level system for monitoring the interaction devices such that at least one respectively suitable output display type is selected as a function of the input parameters.

8 Claims, 3 Drawing Sheets

DIFFERENT DISPLAY TYPES IN A SYSTEM-CONTROLLED, CONTEXT-DEPENDENT INFORMATION DISPLAY

FIELD OF THE INVENTION

The invention relates to a system and a method for combined use of different display types in a system-controlled, context-dependent information display.

BACKGROUND OF THE INVENTION

Such a system and method are used, for example, in the field of automation, for production machines and machine tools, for process automation, for diagnosis/servicing support systems and for complex components, appliances and systems, such as vehicles and industrial machines and plants. One particularly advantageous application relates to augmented reality (AR), a new form of man-machine interaction, in which information is overlaid on the user's field of view, for example using data goggles. However, the overlaying process is context-dependent, that is to say it is matched to and derived from the object being viewed, for example a component. The actual field of view of a fitter, for example, thus has information that is important to him added by means of overlaid installation instructions. In this case, augmented reality can, inter alia, replace the conventional installation manual. The solution approach proposed here relates to the use of augmented reality (AR) for installation and assembly, and in the field of servicing and maintenance.

SUMMARY OF THE INVENTION

The invention is based on the object of providing a system and a method which allow information to be provided as appropriate for the situation and user.

This object is achieved by a system for structuring, preparing and outputting information, with the system containing a number of interaction devices for outputting information to a user and for detecting inputs by the user, and a computer unit which can be carried on the body of the user. The system further includes an interaction monitoring system for controlling and coupling the interaction devices and for evaluating a context, which is defined by input parameters, of a specific work situation for the user. The system then determines the interaction devices and selects the information to be output, in each case as a function of the specific context.

The method according to the invention involves structuring, preparing and outputting information, using a number of interaction devices to output information to a user and to detect inputs from the user. The interaction devices are controlled and coupled by means of an interaction monitoring system in a computer unit which can be carried on the body of the user. A context, defined by input parameters, of a specific user work situation is evaluated, the appropriate interaction devices are determined, and the information to be output in each case is selected as a function of the specific context.

The system is advantageously designed such that the interaction monitoring system contains evaluation means for prioritization of one or more interaction devices, such that the interaction devices contain output means for outputting a result of the prioritization to the user. The user can use the output result to make it easier to decide which interaction device or devices it will be sensible for him to use. The large number of interaction devices used make it possible, in particular, for the information to be both static and dynamic. Depending on the nature of the information, the interaction device that is most suitable for information reproduction is proposed or selected by the interaction monitoring system. The interaction monitoring system is advantageously intended for activation and deactivation of the interaction devices as a function of inputs by the user, so that only the actually desired interaction devices are used in parallel. One particularly suitable interaction device for use in the field of augmented reality is a head mounted display with means for detecting inputs by the user, for example a microphone or keys.

BRIEF DESCRIPTION OF THE DRAWINGS

The invention will be described and explained in more detail in the following text with reference to the exemplary embodiments which are illustrated in the appended drawings in which.

DETAILED DESCRIPTION OF THE INVENTION

Figure 1:
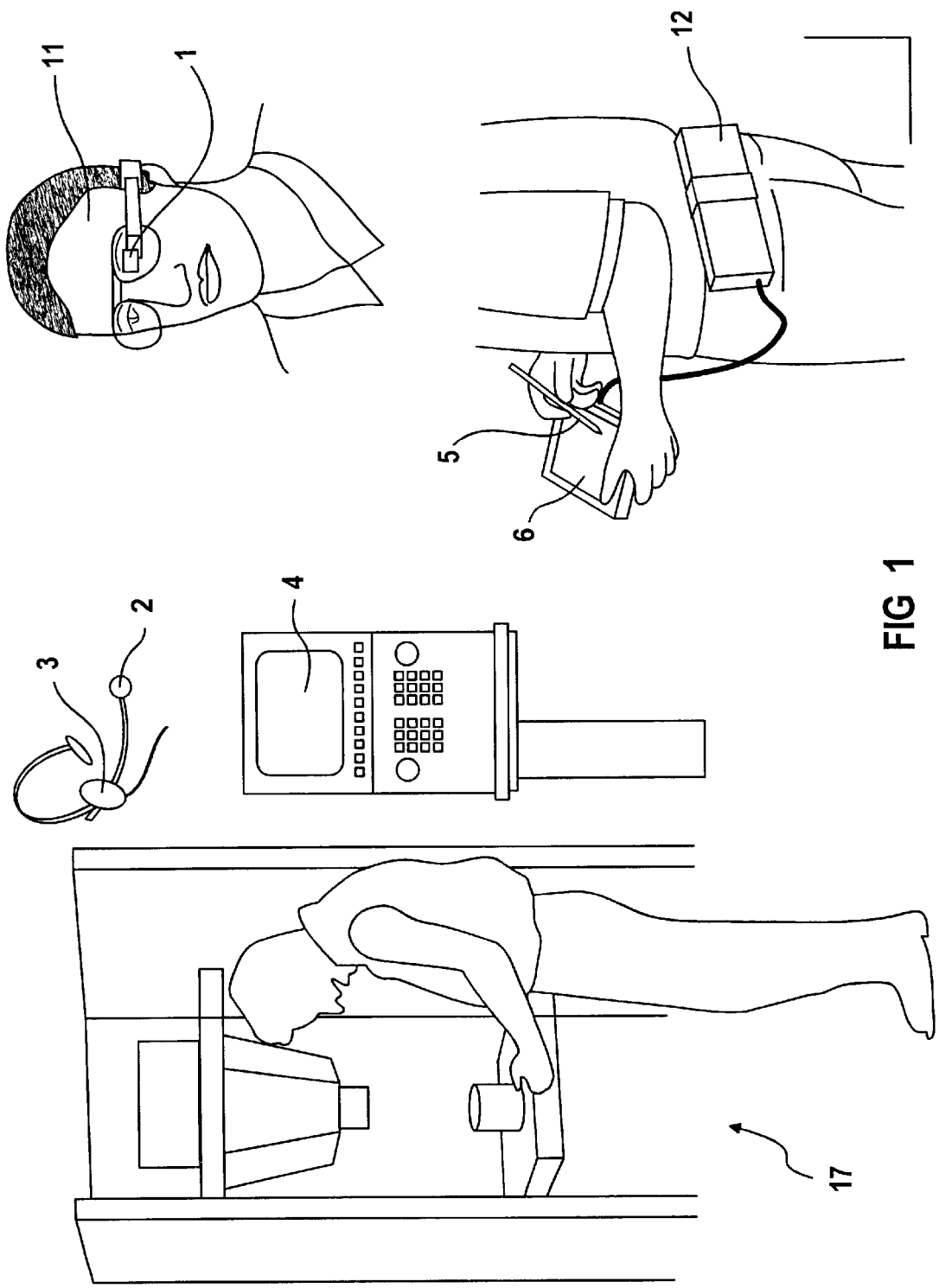
FIG. 1 shows in pictorial form the major system components of a cooperative, augmented work environment.
Figure 2:
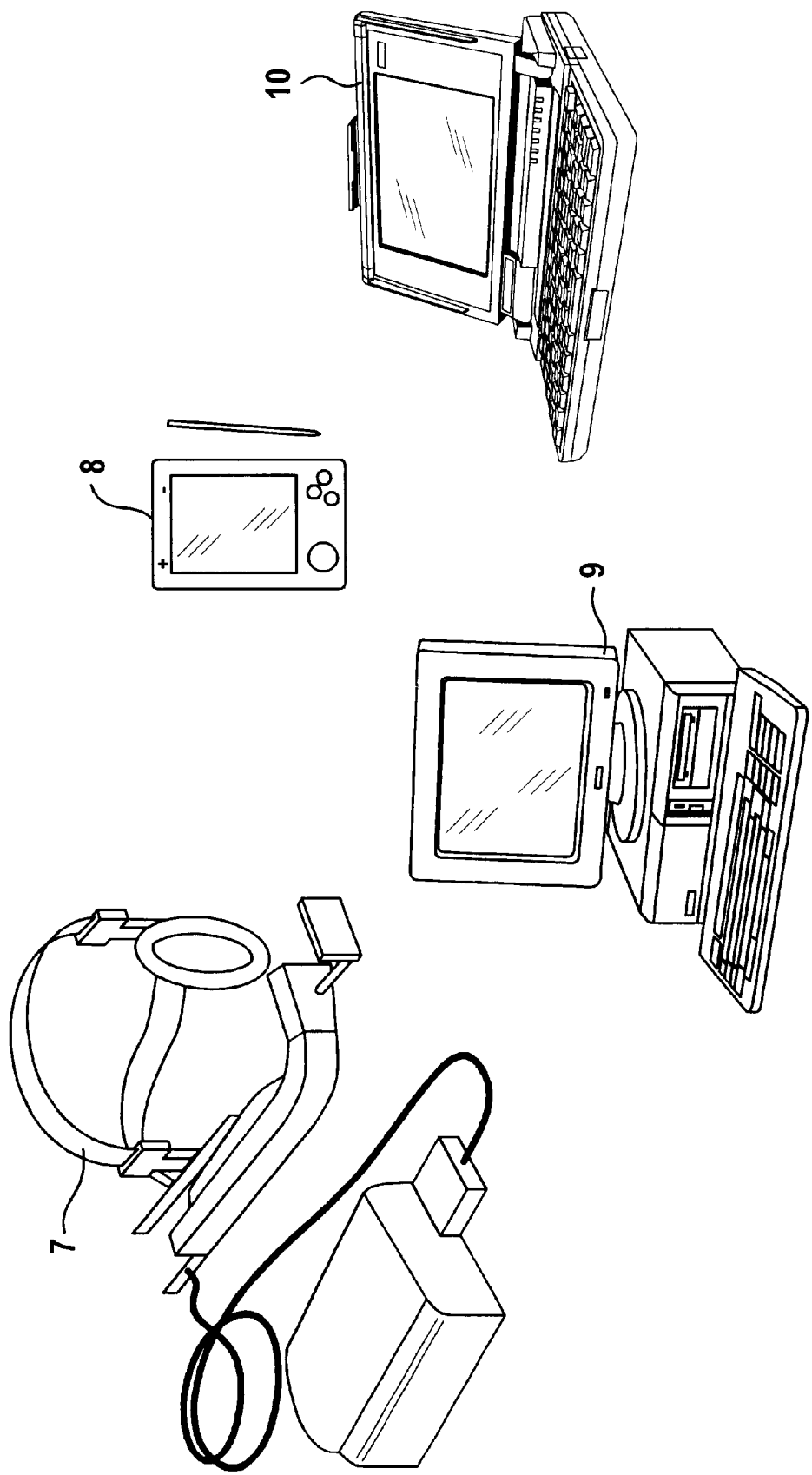
FIG. 2 illustrates possible types of input/output devices for a cooperative, augmented work environment.

In present-day information technology, the wide range of information and data whose suitable structuring and provision by means of data-processing, electronic media and, finally, whose adequate presentation and display to the user, represents a problem in many fields of application. With regard to providing information that is appropriate to the situation and the user, one of which is characteristic of augmented reality-based systems, it is important which interaction device is available to the user (for visual or else audible information). Various types of such interaction devices are identified in FIG. 1 and FIG. 2 by the reference numerals 1 to 10.

Particularly in work situations and environments where information 14 (FIG. 3) whose scope varies from simple texts to detailed graphics plays a role, a requirement for system design is which device 1 to 10 will be most appropriate to the user 11 for his task. This depends, for example, on the activities of the specialist worker/servicing specialist 11 such as fault diagnosis, commissioning, maintenance or repair of machines/plant and on the information he requires to complete his task. This information may be from installation manuals, system documentation or else dynamically determined process values and comprises, inter alia, texts, simple displays of variables or values, or else design drawings such as electrical or mechanical CAD diagrams up to video sequences, for example as task instructions. In principle, the various information types also result in different requirement categories for the display characteristics of the interaction device 1 to 10 being used.

Previous solutions have generally been based on the use of one type of interaction device. At best, different, independently operating interaction devices are used. The user 11 searches for the information 14 required at that time on independently functioning systems. Until now, no support has been provided for a coordinated output, appropriate to the situation, on the display appliances, which differ but are at the same time connected, in the field of view of the user 11.

In the solution to this problem provided by the present invention, the user 11 is provided with a mobile computer 12, which may possibly be carried on the body and is distinguished in that a number of interaction devices 1 to 10 are operated as display and/or input means in parallel on the computer 12, or are coupled to this computer 12 without the use of wires. An overall, higher-level system carries out the monitoring function over the interaction devices 1 to 10. The overall system evaluates the context, defined by different input parameters, of the specific work situation 17 (process data, e.g., location, time, work process, system state, actual user focus, etc.) and decides the output devices and medium which are suitable for the user: voice output, simple output on head mounted display or data goggles, detail displays, for example on a handheld device, system overview and system control on a stationary monitor. The overall system also provides specifically for the combined use of different display devices of such a type. In this case, the user 11 may be informed alternately, by means of the display options of the devices 1 to 10 when information that is in each case significant for a further device comes into view. The advantage is the selection appropriate to the user with respect to the information 14 to be displayed, of the interaction devices 1 to 10 in the context of the given work situation 17. The user 11 can vary the number of devices 1 to 10 available to him, that is to say he can reduce or increase the number, or make this number known to the interaction monitoring system. [The following items should be mentioned as special features:] Context information (location, time, work process, system state—that is to say process data—, actual user focus etc.) is evaluated for selection and coordination of interaction appliances 1 to 10, especially display appliances, as appropriate to the situation and user. A mobile computer 12, carried on the body, is provided, with the capability to connect a number of different types of display devices 1 to 10, as may be required with or without the use of wires.

An exemplary embodiment will now be described.

The servicing technician 11 enters an automatically controlled system or plant, in which he is to carry out maintenance or repair work. The servicing technician 11 is equipped with a computer 12 carried on his belt and referred to in the following text as the service computer. The service computer 12 is connected to a head-worn device 7 (FIGS. 2 and 3) including a head mounted display (HMD) 1 positioned in the field of view of the user 11. Furthermore, the computer 12 has equipment for acoustic input (microphone 2) and audible output (headset 3) carried on the device 7. As a further display device, the service computer 12 is connected to a flat panel display 6, which the user 11 keeps with him while he is working, in a pocket attached to the belt. A network link without the use of wires is used for interchanging data between the service computer 12 and further, additional stationary computers. In the first display 1, directly in his field of view, the user 11 is provided merely with simple instructions 14 relating to the procedure for his present work situation 17. This does not restrict his field of view and perception of the actual task. In addition, relevant process data, which characterize the system or plant situation in more detail, are overlaid automatically for him or on demand. This is done via the wire-free network link from the service computer 12. At the moment when the work situation 17 requires detailed information, for example, from the system documentation, to be displayed, the user 11 is provided in his display 1, with information of, for example, the "updated detailed information on the flat panel display" type. This information may possibly also be provided audibly. The user 11 acknowledges that he is aware of the new information, otherwise he will be reminded of it once again after a given time interval. A stationary computer 4 in the user's working environment 17 is also notified when said user 11 is provided with relevant information.

Figure 3:
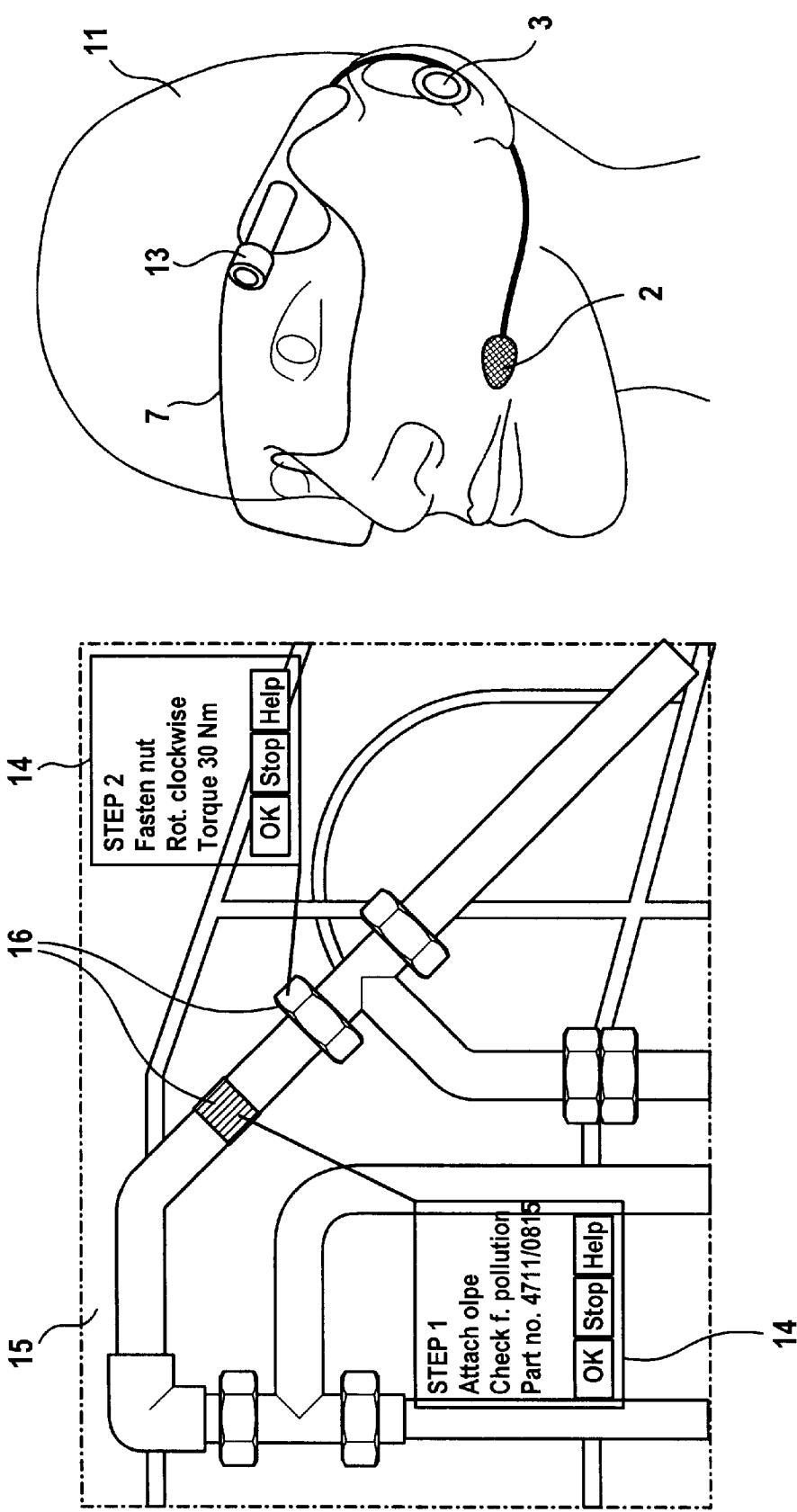
FIG. 3 shows an exemplary application of the practical use of augmented reality.

Augmented reality is a new form of man machine interaction (see FIG. 3) that provides the user 11 with information 14, for example by overlaying in his field of view 15 via data goggles on the head-worn device 7. The data goggles contain not only the display apparatus 1 arranged in the area of the lenses of the goggles but also a video recording apparatus 13 in the form of a camera, and a microphone 2. The user 11 can use the data goggles to move in the area of the system and to carry out servicing or maintenance tasks. With suitable system support, the information 14 is overlaid on a context-dependent basis matching and derived from the object 16 being viewed, for example a component or an installation environment. The actual field of view 16 of a fitter 11, for example, thus has important information added to it by means of overlaid installation instructions 14. The video information recorded by the camera 13 is used to determine the viewing focus of the user 11, and thus the object 16 being looked at. In the situation described, augmented reality firstly replaces the conventional installation manual, and also provides up-to-date process-relevant information such as pressure, temperature, and rotation speed. FIG. 3 shows a sketch of the overlaying of information 14 (in this case, two task steps) against the background from reality in the given work situation 17 (here, pipeline installation).

In summary, the invention relates to a system and a method for combined use of different display devices with system-controlled, context-dependent information display, having a mobile data processing apparatus 12 and having a large number of interaction devices which may be operated in parallel on the mobile data processing apparatus 12, for display and/or input, and having a higher-level system for monitoring the interaction devices in such a manner that at least one respectively suitable output medium is selected as a function of the input parameters.

We claim:

1. A method for structuring, preparing and outputting information in which a plurality of interaction devices are used to output information to a user and to detect inputs by the user wherein the interaction devices are controlled and coupled by means of an interaction monitoring system in a computer unit carried on the body of the user, comprising the steps of evaluating a context defined by input parameters of a specific work situation for the user, determining which of the interaction devices are to be used to output information, and selecting the information to be output as a function of the defined context, and further comprising utilizing the interaction monitoring system to prioritize at least one interaction device and outputting a result of the prioritization of the user.

2. The method according to claim 1, wherein the information is in the form of static and dynamic information.

3. The method according to claim 1, wherein the selection of interaction devices is a function of inputs by the user.

4. The method according to claim 1, further comprising the steps of prioritizing the information to be output with said interaction devices and providing said prioritized information to the user via said interaction devices.

5. A system for structuring, preparing and outputting information comprising a plurality of interaction devices for outputting information to a user and for detecting inputs from the user, and a computer unit carried on the body of the user, said computer including
an interaction monitoring system for controlling and coupling said interaction devices to evaluate a context, defined by input parameters, of a specific work situation for the user, and for determining, as a function of the specific context, the information to be output and further wherein the interaction monitoring system comprises evaluation means for prioritization of one or more interaction devices and wherein the interaction devices include output means for outputting a result of the prioritization to the user.

6. The system according to claim 5, wherein at least one of said interaction devices is in the form of a head mounted display with means for detecting inputs by the user.

7. The system according to claim 5, wherein the information is in the form of static and dynamic information.

8. The system as claimed according to claim 5, wherein the interaction monitoring system controls the activation and deactivation of interaction devices as a function of inputs by the user.

* * * * *